(No Model.)

N. B. ALDRICH.
SECONDARY BATTERY.

No. 408,367. Patented Aug. 6, 1889.

WITNESSES:

INVENTOR
Nathaniel B. Aldrich.
BY 
ATTORNEY

UNITED STATES PATENT OFFICE.

NATHANIEL B. ALDRICH, OF FALL RIVER, MASSACHUSETTS.

SECONDARY BATTERY.

SPECIFICATION forming part of Letters Patent No. 408,367, dated August 6, 1889.

Application filed August 25, 1888. Serial No. 283,718. (No model.)

*To all whom it may concern:*

Be it known that I, NATHANIEL B. ALDRICH, a citizen of the United States, residing in Fall River, in the county of Bristol and State of Massachusetts, have invented certain new and useful Improvements in Secondary Batteries, of which the following is a specification.

My invention relates to secondary electric batteries, with particular reference to the plates or electrodes of the same.

The invention consists, generally, of the plates of a secondary battery formed by electro-depositing upon a suitable support, plate, or frame a coating or plating of lead by the process hereinafter described. The support, plate, or frame in this instance may be formed of any suitable material, either metallic or non-metallic, but preferably of some material which is not easily oxidized, such as a compound of lead and arsenic, or lead, arsenic, and mercury.

It is not necessary to the proper carrying out of my invention that the plates should be of any particular form. They may be solid, perforated, grooved, corrugated, or in any other form desired.

In carrying out the process I first coat the supports, frames, or plates with iron, zinc, tin, or copper. This is accomplished by the electrolysis of a solution containing one or more of the metals mentioned. The next step in the process is to deposit a layer of lead upon the plate after it has been coated as above stated. This deposit is accomplished by the electrolysis of a solution of any soluble lead salt. The deposit thus made will be combined to a greater or less extent with the iron, zinc, tin, or copper coating which the plate first received. This deposit of lead is then to be converted into active material.

Figure 1:
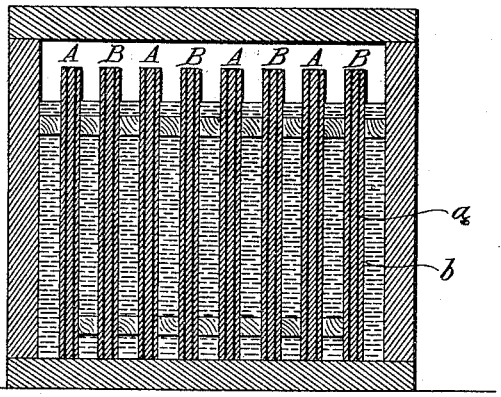
Figure 2:
Figure 2:

In the drawings, Figure 1 is a section of a secondary battery, and Fig. 2 is a detail section of one of the electrodes.

A and B represent the positive and negative plates, respectively.

*a* represents the layer or plating of iron, zinc, tin, or copper, and *b* the layer of spongy lead.

I am aware that it is not new to electro-deposit lead upon the plates of a secondary battery; but, so far as known to me, all such attempts to provide a practical and commercial article have failed, inasmuch as the deposit of lead would peel off after they had been in use a short time. In fact, the plates could not be handled at all without danger of shaking off the deposit. I claim that the first treatment of the plates described herein prevents such a catastrophe, and also enables the plate to take a thicker and more even coating. The coating is also spongy and easily oxidized.

To produce an extraordinary thick coat of lead by the deposition process, I repeat the process herein described as many times as desirable—that is to say, the iron, zinc, tin, or copper coating and the lead coating may be followed by another layer of the iron, zinc, tin, or copper, and then a deposit of lead, as before, and so forth.

Having described my invention, I claim—

1. The herein-described electrode for batteries, which consists of a plate or frame of any material, whether metallic or non-metallic, having a coating or layer of iron, zinc, tin, or copper, and superposed upon said layer another layer or coating of lead, the said plate then being formed for use.

2. The herein-described electrode for batteries, which consists of a plate or frame of any material, whether metallic or non-metallic, having a coating or layer of iron, zinc, tin, or copper, and superposed upon said layer by the process of electro-deposition another layer or coating of lead, the said plate then being formed for use.

In witness whereof I have hereunto signed my name in the presence of two subscribing witnesses.

NATHANIEL B. ALDRICH.

Witnesses:
JOHN BEATTIE, Jr.,
WM. A. ROSENBAUM.